(12) United States Patent
Höhne et al.

(10) Patent No.: US 11,395,237 B2
(45) Date of Patent: Jul. 19, 2022

(54) ADJUSTING SUB-BAND TRANSMIT POWER BASED ON LISTEN BEFORE TALK MEASURED INTERFERENCE

(71) Applicant: Nokia Technologies Oy, Espoo (FI)

(72) Inventors: Hans Thomas Höhne, Helsinki (FI); Timo Erkki Lunttila, Espoo (FI); Kyoungmin Park, Suji gu (KR)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/284,980

(22) PCT Filed: Oct. 23, 2019

(86) PCT No.: PCT/FI2019/050750
§ 371 (c)(1),
(2) Date: Apr. 13, 2021

(87) PCT Pub. No.: WO2020/089514
PCT Pub. Date: May 7, 2020

(65) Prior Publication Data
US 2021/0329565 A1    Oct. 21, 2021

Related U.S. Application Data

(60) Provisional application No. 62/754,778, filed on Nov. 2, 2018.

(51) Int. Cl.
*H04W 52/24* (2009.01)
*H04W 52/22* (2009.01)
*H04W 74/08* (2009.01)

(52) U.S. Cl.
CPC ....... *H04W 52/243* (2013.01); *H04W 52/226* (2013.01); *H04W 74/0808* (2013.01)

(58) Field of Classification Search
CPC ... H04W 16/14; H04W 52/16; H04W 52/226; H04W 52/24; H04W 52/243;
(Continued)

(56) References Cited

U.S. PATENT DOCUMENTS

2017/0311327 A1   10/2017  Tanaka
2018/0227912 A1    8/2018  Chen et al.
(Continued)

FOREIGN PATENT DOCUMENTS

EP        1006745 A1     6/2000
WO    2016/119839 A1     8/2016

OTHER PUBLICATIONS

"Revised SID on NR-based Access to Unlicensed Spectrum", 3GPP TSG RAN Meeting #80, RP-181339, Agenda: 9.4.3, Qualcomm Incorporated, Jun. 11-14, 2018, 5 pages.
(Continued)

*Primary Examiner* — Philip Sobutka
(74) *Attorney, Agent, or Firm* — Harrington & Smith

(57) ABSTRACT

A method includes determining, by a terminal device, at least one transmission power target level for an intended transmission on at least one sub-band. The method also includes performing a listen before talk procedure and measuring interference, and determining at least one power offset for transmission as outcome of the listen before talk procedure and the measured interference. The method further includes transmitting at least one message on at least one listen before talk allowed sub-band, using a transmission power determined based at least in part on the at least one transmission power target level for the intended transmission on the at least one sub-band, and the at least one power offset.

20 Claims, 10 Drawing Sheets

(58) Field of Classification Search
CPC . H04W 72/08; H04W 74/08; H04W 74/0808; H04B 17/354; H04L 27/00
USPC .......................................................... 455/522
See application file for complete search history.

(56) References Cited

U.S. PATENT DOCUMENTS

2019/0230706 A1* 7/2019 Li ..................... H04W 88/08
2020/0275484 A1* 8/2020 Xu .................... H04W 72/0453

OTHER PUBLICATIONS

"LS on Wideband Carrier Operation for NR-U", 3GPP TSG RAN WG1 Meeting #94bis, R1-1812026, RAN1, Oct. 8-12, 2018, 2 pages.

"3rd Generation Partnership Project; Technical Specification Group Radio Access Network; NR; Physical layer procedures for control (Release 15)", 3GPP TS 38.213 V15.3.0, Sep. 2018, pp. 1-101.

"3rd Generation Partnership Project; Technical Specification Group Radio Access Network; NR; Radio Resource Control (RRC) protocol specification (Release 15)", 3GPP TS 38.331 V15.3.0, Sep. 2018, pp. 1-445.

"3rd Generation Partnership Project; Technical Specification Group Radio Access Network; Physical layer procedures for shared spectrum channel access (Release 15)", 3GPP TS 37.213 V15.2.0, Mar. 2019, pp. 1-20.

"3rd Generation Partnership Project; Technical Specification Group Radio Access Network; NR; Medium Access Control (MAC) protocol specification (Release 15)", 3GPP TS 38.321 V15.7.0, Sep. 2019, pp. 1-78.

International Search Report and Written Opinion received for corresponding Patent Cooperation Treaty Application No. PCT/FI2019/050750, dated Jan. 29, 2020, 14 pages.

* cited by examiner

| SUB-BAND INDEX | 1 | 2 | 3 | 4 | | 1 | 2 | 3 | 4 |
|---|---|---|---|---|---|---|---|---|---|
| CASE 520 | | | | | RRC CONFIGURED OFFSET PER INTERFERENCE LEVEL | | | | |
| 1 | x | x | TB1 | I_1 | | 0 | 0 | O1 | x |
| 2 | x | TB2 | | I_1 | | 0 | O2 | O2 | x |
| 3 | x | x | TB1 | I_2 | | 0 | 0 | O3 | x |
| 4 | x | TB2 | | I_2 | | 0 | O4 | O4 | x |

FIG.5

| CASE | BEAM_INDEX 610 | SUB-BAND INDEX | | | | RRC CONFIGURED OFFSET, PER INTERFERENCE LEVEL | | | |
|---|---|---|---|---|---|---|---|---|---|
| | | 1 | 2 | 3 | 4 | 1 | 2 | 3 | 4 |
| 1 | 1 | x | x | TB1 | I_1 | 0 | 0 | 01 | x |
| 2 | 1 | x | TB2 | TB2 | I_1 | 0 | 02 | 02 | x |
| 3 | 1 | x | x | TB1 | I_2 | 0 | 0 | 03 | x |
| 4 | 1 | x | TB2 | TB2 | I_2 | 0 | 04 | 04 | x |
| 5 | 2 | x | x | TB1 | I_1 | 0 | 0 | 05 | x |
| 6 | 2 | x | TB2 | TB2 | I_1 | 0 | 06 | 06 | x |
| 7 | 2 | x | x | TB1 | I_2 | 0 | 0 | 07 | x |
| 8 | 2 | x | TB2 | TB2 | I_2 | 0 | 08 | 08 | x |

FIG.6

```
PUSCH-PowerControl ::=        SEQUENCE{                                                              ┌─700
    tpc-Accumulation           ENUMERATED { disabled }
                                                    OPTIONAL,  -- Need S
    msg3-
    Alpha                      Alpha
                               OPTIONAL,  -- Need S
    p0-NominalWithoutGrant                  INTEGER(-202..24) OPTIONAL,  -- Need M,
    p0-AlphaSets                            SEQUENCE (SIZE (1..maxNrofP0-PUSCH-
                                                    OPTIONAL,  -- Need M,
    AlphaSets)) OF P0-PUSCH-AlphaSet        SEQUENCE (SIZE (1..maxNrofP0-sub-        ┌─710
    [p0-sub-bandOffset                                  OPTIONAL,  -- Need M,]*
    bandOffsets)) OF P0-PUSCH-sub-bandOffset SEQUENCE (SIZE (1..maxNrofPUSCH-
    pathlossReferenceRSToAddModList                      OPTIONAL,  -- Need N
    PathlossReferenceRSs)) OF PUSCH-PathlossReferenceRS
    pathlossReferenceRSToReleaseList        SEQUENCE (SIZE (1..maxNrofPUSCH-
    PathlossReferenceRSs)) OF PUSCH-PathlossReferenceRS-Id
                                                     OPTIONAL,  -- Need N
    twoPUSCH-PC-AdjustmentStates   ENUMERATED
    {twoStates}
    deltaMCS                   ENUMERATED                OPTIONAL,  -- Need S
    (enabled)
    sri-PUSCH-MappingToAddModList      SEQUENCE (SIZE (1..maxNrofSRI-PUSCH-
    Mappings)) OF SRI-PUSCH-PowerControl                 OPTIONAL,  -- Need N
    sri-PUSCH-MappingToReleaseList     SEQUENCE (SIZE (1..maxNrofSRI-PUSCH-
    Mappings)) OF SRI-PUSCH-PowerControlId               OPTIONAL,  -- Need N
    }
    [P0-PUSCH-sub-bandOffset::=    SEQUENCE {                      ┌─720
    adjacent-sub-band-interference-level           value_i_dBm,
    single-TB-sub-bandOffset-Level                 value_01_dB
    dual-TB-sub-bandOffset-Level                   value_02_dB
    }]*
```

FIG. 7

| SUB-BAND INDEX | 1 | 2 | 3 | 4 | RRC CONFIGURED OFFSET, PER INTERFERENCE LEVEL | | | |
|---|---|---|---|---|---|---|---|---|
| CASE 520 | | | | | 1 | 2 | 3 | 4 |
| 1 | TB1 | TB2 | TB3 | | O1 | O2 | O3 | x |
| 2 | TB1 | TB2 | TB2 | | O4 | O5 | O5 | |
| 3 | TB1 | TB2 | | | O6 | O7 | | |
| 4 | TB1 | TB1 | | | O8 | O8 | | x |
| 5 | TB1 | | | | O9 | | x | x |
| 6 | TB1 | | | TB2 | O10 | x | x | O11 |
| 7 | TB1 | TB2 | TB2 | | O12 | x | O13 | x |
| 8 | TB1 | TB2 | | TB3 | O14 | O15 | x | O16 |
| 9 | TB1 | | | TB2 | O17 | O17 | x | O19 |

FIG.8

| SUB-BAND INDEX | SUB-BAND OFFSET [dB] | | | | SUB-BAND INTERFERENCE POWER [dBm] | | | | P_HR | h |
|---|---|---|---|---|---|---|---|---|---|---|
| | 1 | 2 | 3 | 4 | 1 | 2 | 3 | 4 | | |
| | 0 | 0 | 0 | x | <-70 | x | x | x | | |
| | 0 | 0 | x | x | <-70 dBm | x | x | ARBITRARY | | |
| ONE TB PER SUB-BAND | 0 | 0 | 3*h | x | (-70...-30) | x | x | (-70...-30) | 4 | 1 |
| | | | | | | | | | 2 | 2/3 |
| ONE TB PER SUB-BANDs 2+3 | 0 | 3*h | 3*h | | (-70...-30) | x | x | | 7 | 1 |
| | | | | | | | | | 4 | 4/6 |
| | | | | | | | | | 2 | 2/6 |

FIG.9

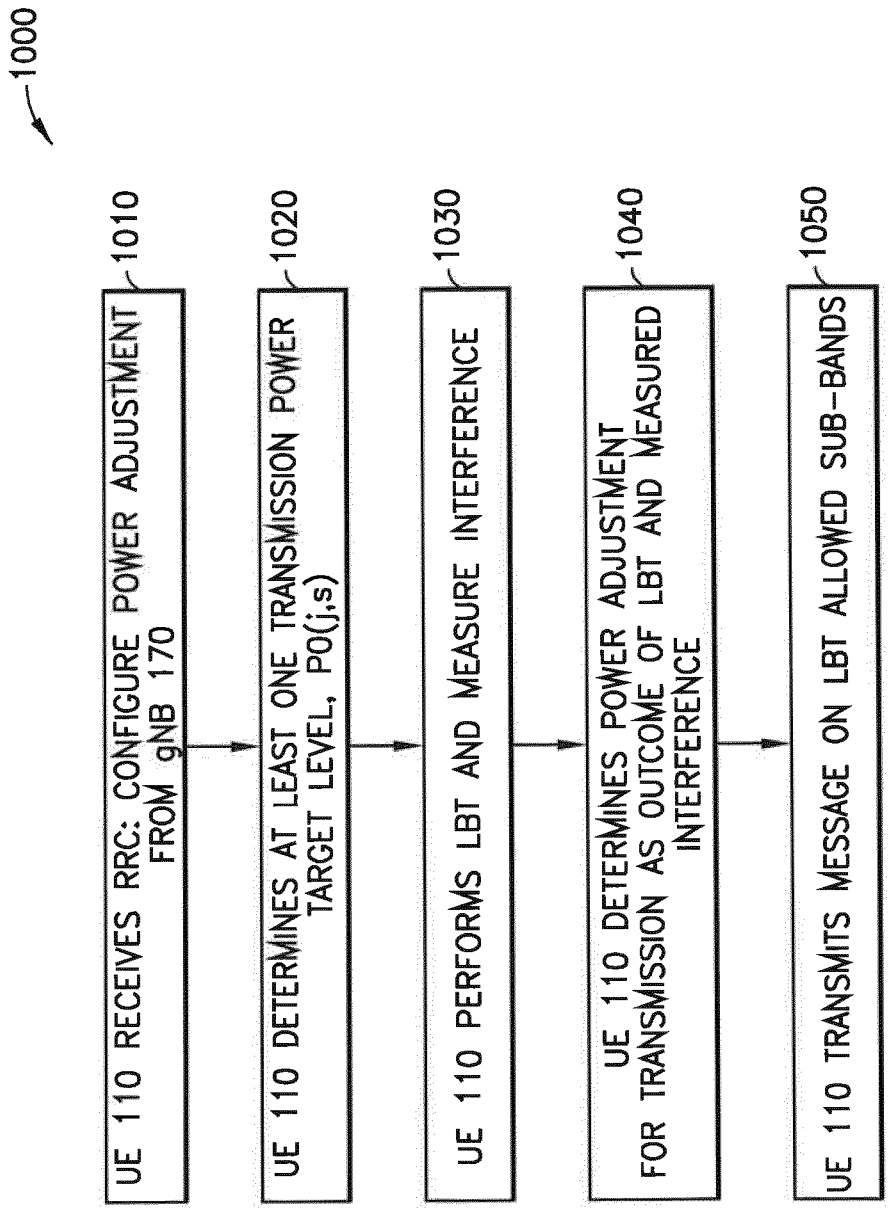

ADJUSTING SUB-BAND TRANSMIT POWER BASED ON LISTEN BEFORE TALK MEASURED INTERFERENCE

RELATED APPLICATION

This application was originally filed as PCT Application No. PCT/FI2019/050750, filed on 23 Oct. 2019, which claims priority from U.S. provisional Application No. 62/754,778, filed on 2 Nov. 2018, each of which is incorporated herein by reference in its entirety.

TECHNICAL FIELD

The teachings in accordance with exemplary embodiments relate generally to radio based access to unlicensed spectrum, more particularly to uplink power control in instances of LBT.

BACKGROUND

3GPP approved a study item related to NR-based access to unlicensed spectrum (particularly, RP-181339). 3GPP Radio Working Group 1 (RANI) has also discussed a variety of options for both DL and UL transmission on a wideband carrier (>20 MHz) in unlicensed spectrum that may or may not require multiple active bandwidth parts. Issues arising from adjacent band interference have been recognized in RANI and were expressed in the draft LS from RAN1 to RAN4.

Certain abbreviations that may be found in the description and/or in the Figures are herewith defined as follows:
BWP Bandwidth Part
CCA clear channel assessment
COT Channel Occupancy Time
CS carrier sense
DCI Downlink control information
DL Down link
eNB enhanced Node-B
FFT Fast Fourier Transform
gNB 5G Enhanced Node B (Base station)
LAA Licensed Assisted Access
LBT Listen Before Talk
LS Liaison Statement
LTE long term evolution
MCOT Maximum Channel Occupancy Time
MCS Modulation and Coding scheme
MIMO Multiple-Input Multiple-Output
MTD Machine Type Device
NR New radio
NR-U New-radio—unlicensed
NZP Non-zero power
P0 power control power level 0
PC Power Control
PSD Power Spectral Density
PUCCH Physical Uplink Control Channel
PUSCH Physical Uplink Shared Channel
RRC Radio Resource Control
TB Transport Block
UE User Equipment
UL Uplink
3GPP 3rd Generation Partnership Project

BRIEF SUMMARY

The following summary includes examples and is merely intended to be exemplary. The summary is not intended to limit the scope of the claims.

In accordance with one aspect, an example method comprisesdetermining, by a terminal device, at least one transmission power target level for an intended transmission on at least one sub-band. The method also includes performing a listen before talk procedure and measuring interference, and determining at least one power offset for transmission as outcome of the listen before talk procedure and the measured interference. The method further includes transmitting at least one message on at least one listen before talk allowed sub-band, using a transmission power determined based at least in part on the at least one transmission power target level for the intended transmission on the at least one sub-band, and the at least one power offset.

In accordance with another aspect, an example apparatus comprises means for determining at least one transmission power target level for an intended transmission on at least one sub-band; means for performing listen before talk procedure and measuring interference; means for determining at least one power offset for transmission as outcome of the listen before talk procedure and the measured interference; and means for transmitting at least one message on at least one listen before talk allowed sub-band, using a transmission power determined based at least in part on the at least one transmission power target level for the intended transmission on the at least one sub-band, and the at least one power offset.

In accordance with another aspect, an example apparatus comprises at least one processor; and at least one non-transitory memory including computer program code, the at least one memory and the computer program code may be configured to, with the at least one processor, cause the apparatus to: determine at least one transmission power target level for an intended transmission on at least one sub-band; perform a listen before talk procedure and measuring interference; determine at least one power offset for transmission as outcome of the listen before talk procedure and the measured interference; and transmit at least one message on at least one listen before talk allowed sub-band, using a transmission power determined based at least in part on the at least one transmission power target level for the intended transmission on the at least one sub-band, and the at least one power offset.

In accordance with another aspect, an example apparatus comprises a non-transitory program storage device readable by a machine, tangibly embodying a program of instructions executable by the machine for performing operations, the operations comprising: determining at least one transmission power target level for an intended transmission on at least one sub-band; performing a listen before talk procedure and measuring interference; determining at least one power offset for transmission as outcome of the listen before talk procedure and the measured interference; and transmitting at least one message on at least one listen before talk allowed sub-band, using a transmission power determined based at least in part on the at least one transmission power target level for the intended transmission on the at least one sub-band, and the at least one power offset.

BRIEF DESCRIPTION OF THE DRAWINGS

The foregoing and other aspects of embodiments of this invention are made more evident in the following Detailed Description, when read in conjunction with the attached Drawing Figures, wherein:

FIG. 5 illustrates an example table for RRC configured offset values;

FIG. 6 illustrates another example table for RRC configured offset values;

FIG. 7 illustrates an example enhanced PUSCH-Power-Control including a specialized information element;

FIG. 8 illustrates an example table for RRC configured offset values;

FIG. 9 illustrates an example table for offset to a sub-band; and

FIG. 10 shows a flow diagram of a method in accordance with example embodiments which may be performed by an apparatus.

DETAILED DESCRIPTION

In the example embodiments as described herein a method and apparatus that mitigates the effect of the adjacent sub-band interference to the own signal by boosting the transmit power for particular sub-bands. Consistent with example embodiments, a transmitter increases its transmit power on certain sub-bands as a function of the outcome of the LBT operation on other sub-bands, in order to increase the robustness of the signal and aid the intended receiver combat potential adjacent sub-band interference. The transmit power adjustment or an offset may be sub-band and/or beam specific, and may take into account the interference on adjacent sub-bands on beams corresponding to or different from the transmit beam. The amount of power offset may be also specific to the type of transmission (for example, PUSCH or PUCCH)), or the type of grant that a UE has. A grant can be understood as a permission and/or allocation for a UE to transmit. Different types of grants for a UE may be for instance "configured grant", or a scheduled grant. The amount of power adjustment may be also specific to the type of MCOT that is in use for the transmission, that is it may be specific to whether the MCOT is a shared MCOT or not.

Figure 1:
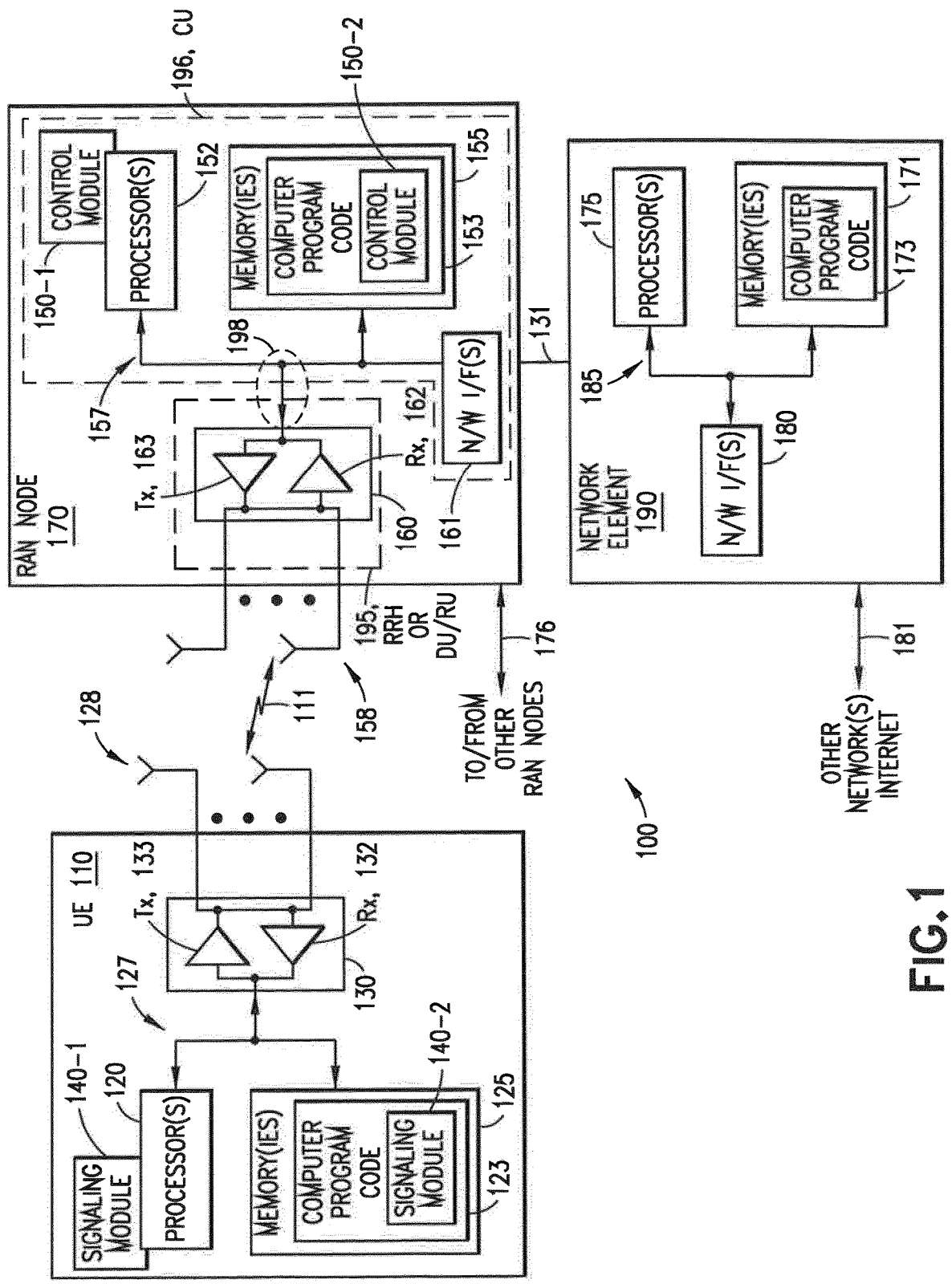
FIG. 1 is a block diagram of one possible and non-limiting example system in which the example embodiments may be practiced.

Turning to FIG. 1, this figure shows a block diagram of one possible and non-limiting exemplary system in which the exemplary embodiments may be practiced. A user equipment (UE) 110, radio access network (RAN) node 170, and network element(s) 190 are illustrated. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a signaling module 140, comprising one of or both parts 140-1 and/or 140-2, which may be implemented in a number of ways. The signaling module 140 may be implemented in hardware as signaling module 140-1, such as being implemented as part of the one or more processors 120. The signaling module 140-1 may be implemented also as an integrated circuit or through other hardware such as a programmable gate array. In another example, the signaling module 140 may be implemented as signaling module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 is a base station that provides access by wireless devices such as the UE 110 to the wireless network 100. The RAN node 170 may be, for instance, a base station for 5G, also called New Radio (NR). The RAN node may be specifically designed to work in unlicensed spectrum and support the so-called NR-U part of the NR standard. In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a control module 150, comprising one of or both parts 150-1 and/or 150-2, which may be implemented in a number of ways. The control module 150 may be implemented in hardware as control module 150-1, such as being implemented as part of the one or more processors 152. The control module 150-1 may be implemented also as an integrated circuit or through other hardware such as a programmable gate array. In another example, the control module 150 may be implemented as control module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the control module 150 may be distributed, such as being distributed between the DU 195 and the CU 196, or be implemented solely in the DU 195.

The one or more network interfaces 161 communicate over a network such as via the links 176 and 131. Two or more gNBs 170 communicate using, e.g., link 176. The link 176 may be wired or wireless or both and may implement, e.g., an Xn interface for 5G, an X1 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 198 also indicates those suitable network link(s). RAN node 170 may be implemented by IAB node. For example, DU part of the IAB node may facilitate gNB functionality, where MT part of the IAB node facilitates the backhaul connection to anther IAB node, or to RAN node 170.

The wireless network 100 may include a network element (or elements) 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Embodiments herein may be implemented in software (executed by one or more processors), hardware (e.g., an application specific integrated circuit), or a combination of software and hardware. In an example of an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium or other device that may be any media or means that can contain or store the instructions for use by or in connection with an instruction execution system, apparatus, or device, such as a computer.

Having thus introduced one suitable but non-limiting technical context for the practice of the exemplary embodiments of this invention, the exemplary embodiments will now be described with greater specificity.

Figure 2:
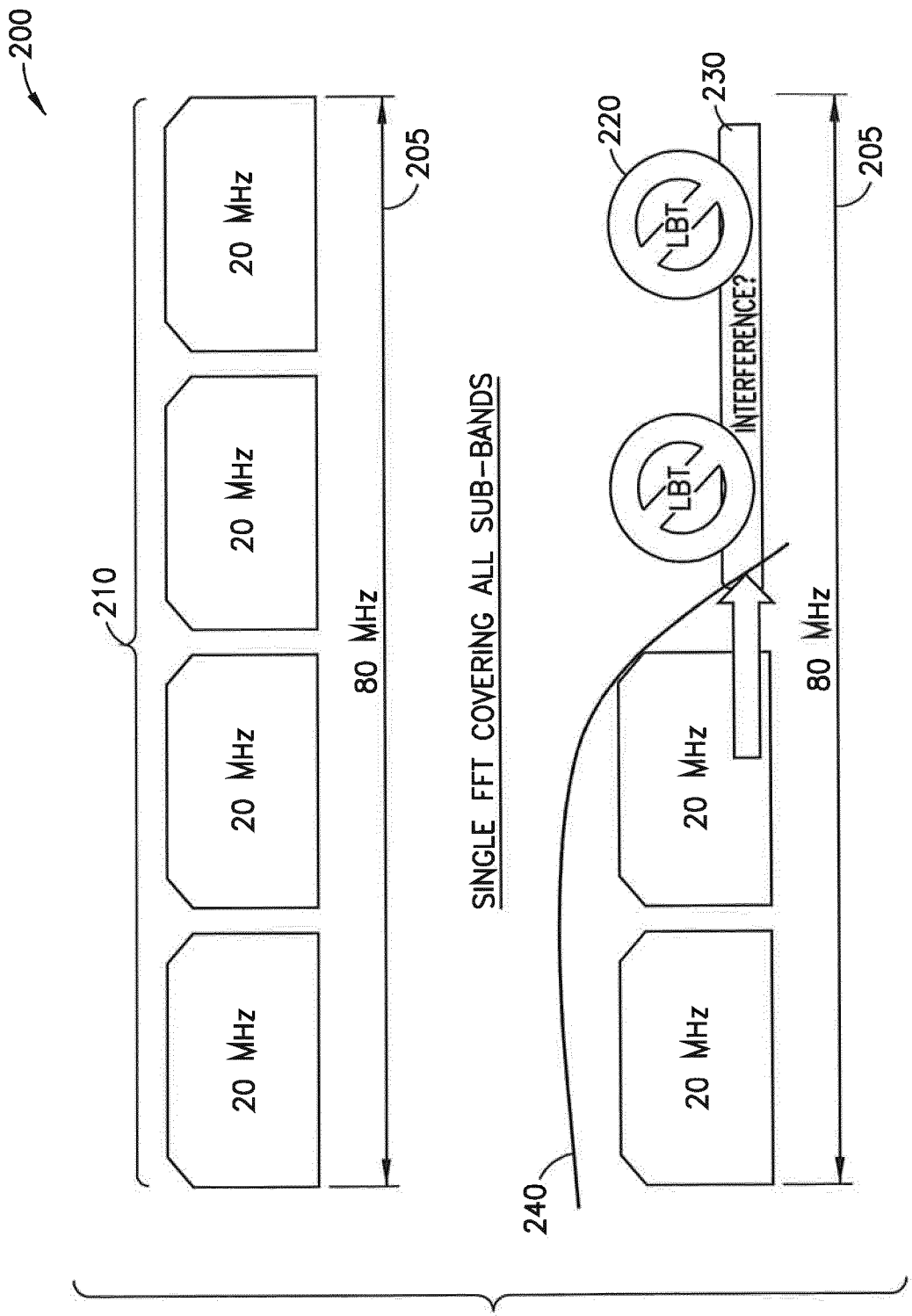
FIG. 2 illustrates an example of a single FFT covering all sub-bands.

FIG. 2 illustrates an example table 200 of a single FFT covering all sub-bands.

LBT is a procedure for a device to contend for access to an unlicensed spectrum channel. The LBT procedure is for instance described by TS 37.213 section 4.2. The LBT procedure may involve performing energy detection and using a back-off timer in case the channel is not free. An LBT using back-off may be described by following steps: 0) assume no back-off counter is running 1) Perform carrier sensing (CS) 2) If not free, defer by QoS specific inter-frame spacing 3) perform random back-off chosen from contention window (CW) size, also QoS specific; CW is increased if next try is also unsuccessful 4) Continue with 1. When the LBT procedure using back-off has been successful and the channel is found free in step 2 and the device (gNB or UE) is allowed to transmit it is said that the device has "won" the channel and may transmit for a certain period, the maximum channel occupancy time (MCOT). In some cases an LBT procedure may involve performing energy detection for a period of time, but not using a back-off timer, which amounts to a clear channel assessment (CCA).

Following the LBT procedure and transmission, another device (typically communicating with the first device) may also use the COT obtained by the first device, without using LBT with back-off. An MCOT obtained by a first device that can be used by another device is called a "shared COT". In a shared COT it might be sufficient for the corresponding device to transmit only using a clear channel assessment (CCA).

In unlicensed spectrum the transmitter is required to perform a listen-before-talk (LBT) operation to assess whether the channel is free before transmitting on it. In the case of wideband (for example, 80 MHz (205), as shown in FIG. 2) operation, the channel may be divided into several sub-bands (of, for example, 20 MHz (210) as shown in FIG. 2), on which parallel LBT processes will be executed. Depending on the outcome of the sub-band LBT, the transmitter may then use one or several of the sub-bands.

In the upper part of the illustration of FIG. 2, a transmitter's LBT processes allowed it to transmit on all sub-bands (210). Correspondingly the receiver will then perform signal processing of all sub-bands. In the lower part of the illustration of FIG. 2 a transmitter's LBT processes allowed it to transmit only on some sub-bands (240) while the interference on other sub-bands (220) prevented transmission there. Correspondingly the receiver will then perform signal processing only for the sub-bands that were transmitted and seek to filter out the other sub-bands (220). The power of interference on an adjacent sub-band in principle is not dependent on the transmit or receive power in the own sub-band. The observed adjacent sub-band interference may be different for the transmitter and receiver. The power of interference on an adjacent sub-band as seen by the receiver may have an impact on the receiver's ability to decode the own sub-band, as explained in the next paragraphs.

Figure 3:
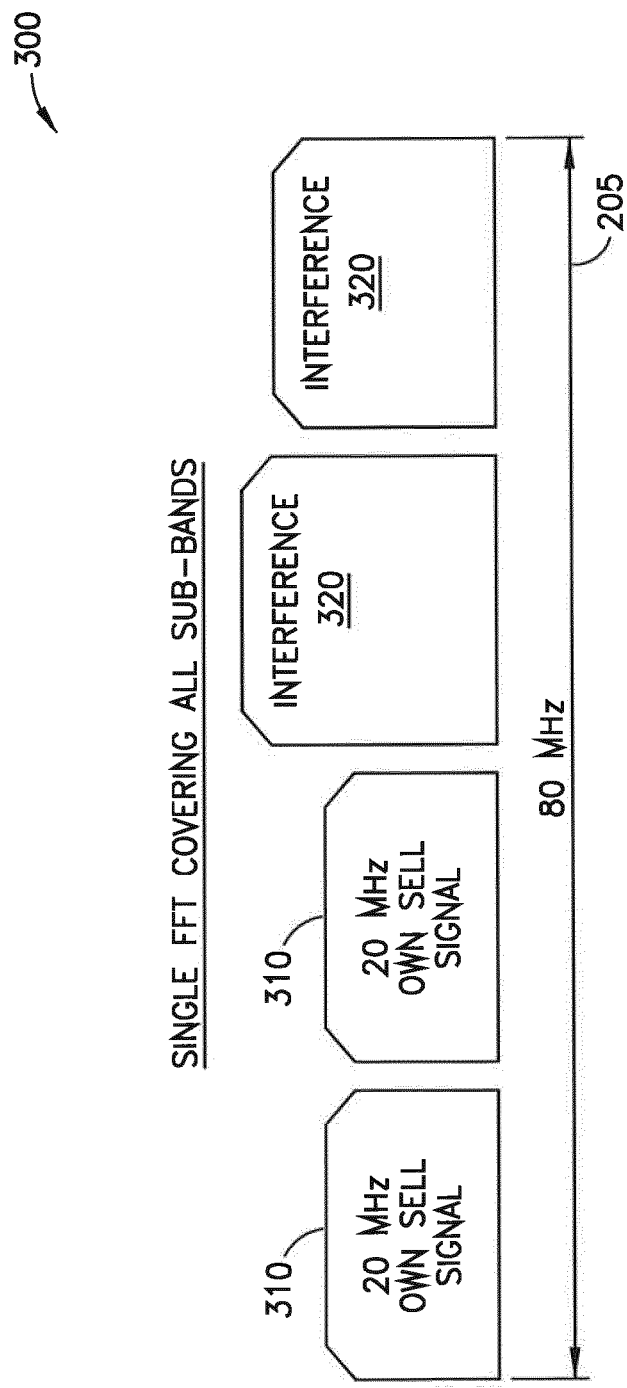
FIG. 3 illustrates another example of a single FFT covering all sub-bands; the figure illustrates how a receiver can see on a sub-band adjacent to its own sub-band(s) interference which is stronger than its own signal.

Referring now to FIG. 3, an example table 300 shows another example of a single FFT covering all sub-bands. In instances, a receiver may happen to see interference 320 in an adjacent sub-band which is stronger than its own signal 310, as shown in FIG. 3

In principle regulations on sub-band emissions ensure that there is sufficient sub-band separation. In practice the receivers may however see leakage from the bands that are occupied by other transmitters, especially if those have stronger power as seen by the receiver.

FIGS. 2 and 3 illustrate an example of an 80 MHz carrier or Bandwidth Part (BWP) which has 4×20 MHz sub-bands (channelization on, for example, 5 GHz unlicensed spectrum). The UE 110 may perform Listen Before Talk (LBT) with 20 MHz raster before transmission, determine (for example, perform energy detection, observe, be notified, etc.) that sub-bands 3 and 4 are occupied (causing interference 320), and therefore use only sub-bands 1 and 2 in its transmission.

In this considered scenario the receiver may sample the whole wideband signal (for example, 4×20 MHz) and use digital processing to filter out sub-bands as needed. The example embodiments disclosed herein provide a method that mitigates the effect of the adjacent sub-band interference 320 to the own (in this instance 20 MHz) signal 310 by boosting the transmit power for particular sub-band(s).

Figure 4:
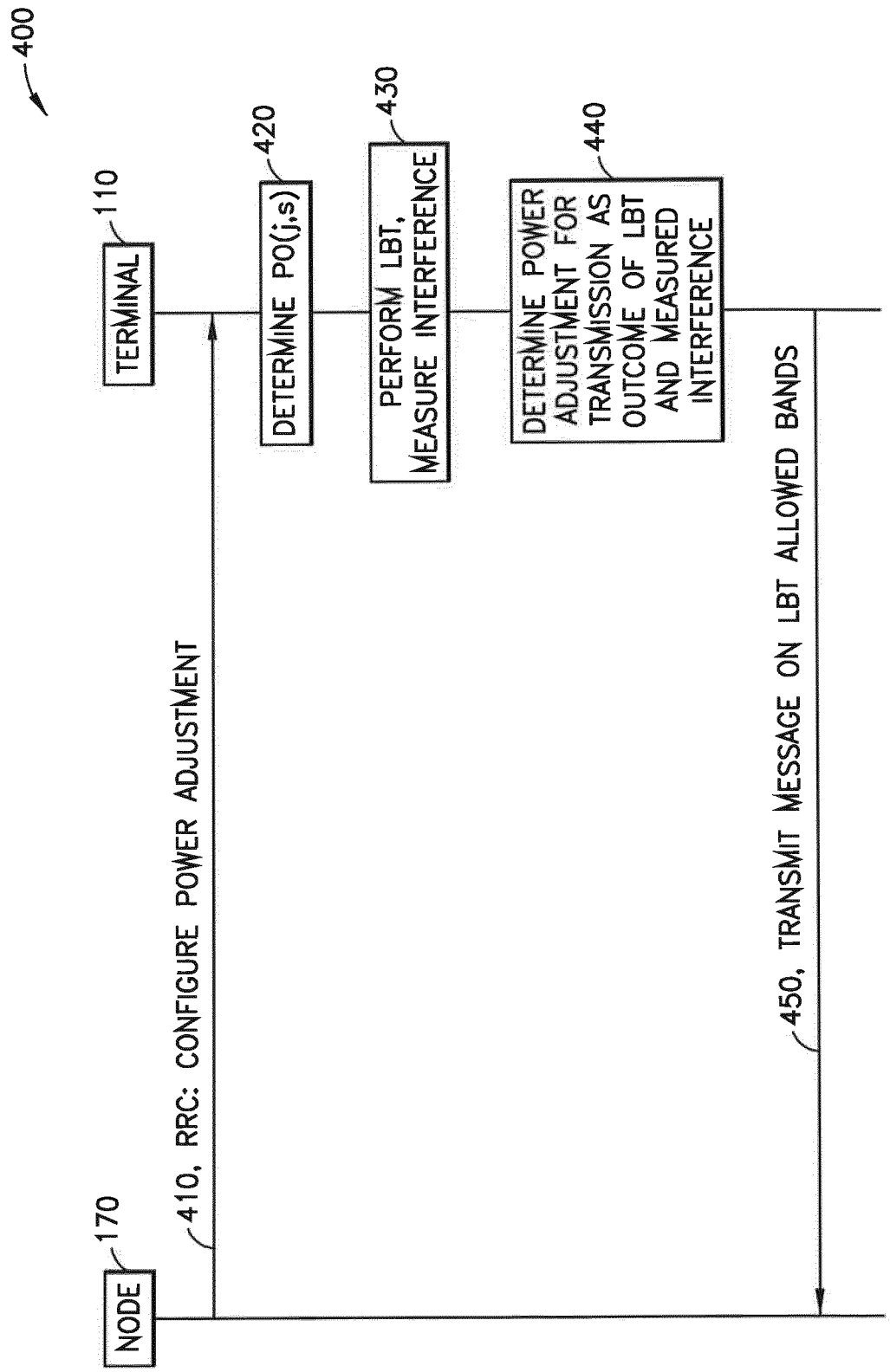
FIG. 4 illustrates an example signalling diagram between a node and a terminal including transmit power adjustment.

FIG. 4 illustrates illustrates an example signalling diagram 400 between a node and a terminal including transmit power adjustment.

As shown in FIG. 4, signalling is implemented between a node (for example, gNB) 170 and a terminal (for example, UE) 110. The signaling and the actions carried out are visualized on a high level in FIG. 4. The example embodiments implement defined rules for UL power control, according to which a transmitter increases its transmit power on certain sub-bands as a function of the outcome of the LBT operation on other sub-bands, in order to increase the robustness of the signal and aid the intended receiver combat potential adjacent sub-band interference.

The transmit power adjustment may be sub-band and/or beam specific, and may take into account the interference on adjacent sub-bands on beams corresponding to or different from the transmit beam. Similarly, transmission power target level can also be sub-band/beam specific. The example embodiments are applicable to NR-U, and additionally to other radio technologies such as Wi-Fi, LTE LAA, or MulteFire.

According to an example embodiment, UE 110 may be the transmitter. In instances in which the gNB 170 is the transmitter, the power offset calculations may take a different form. An example embodiment may be implemented by the following 5 steps:

At step 1) (420) subsequent to receiving RRC: configuration of power adjustment from gNB 170 (410), the terminal (UE 110) may determine at least one transmission power target level, that is P0(j,s), for an intended transmission on n sub-bands, where j is the index to a beam if beams are being used, and s is a sub-band index. UE 110 may determine a) either where P0(j,s) is the same for all s (for instance because a single TB is transmitted via all sub-bands), s=1 . . . n, or b) where separate values P0(j,s) are determined for the separate sub-bands (for instance because separate TBs are transmitted on each sub-band). c) This may be done, for example, based on the NR power control formula.

At step 2) (430) UE 110 may perform LBT for each sub-band where the intended transmission would take place. The LBT in the example embodiments, performs further measuring in addition to checking whether the energy of a band exceeds a certain threshold. In the example embodiments, the LBT may be required to measure the energy level, and/or measure whether the energy level exceeds additional thresholds that may be implemented (or used to implement processes) relating to the required robustness in adjacent bands.

At step 3) (not separately shown in FIG. 4) UE 110 may determine, based on LBT, that transmission is not allowed on m of the intended n sub-bands, where 0<m<n. For example, if the observed energy level on a given sub-band exceeds −72 dBm, a UE 110 may consider such sub-band busy (transmission not allowed).

At step 4) (440) UE 110 may determine power adjustment for transmission as outcome of LBT and measured difference. UE 110 may compute one or more offsets to each P0(j,s) for the n–m sub-bands that the UE 110 is allowed to use for transmission (for example, the sub-bands that are free according to LBT) based on at least one of: a) The value of m of prohibited sub-bands. b) The location of m sub-bands with respect to the n–m sub-bands that the UE can use for transmission. c) The interference power observed on one or more of the m sub-bands that the UE 110 cannot use for transmission. d) the amount of sub-bands used by a transport block (TB) transmitted (for instance, if a TB is transmitted on two sub-bands, both sub-bands will receive the same adjustment) i. where the adjustment takes the minimum value of the P0(j,s) of the sub-bands being used to transmit a certain TB. ii) where the adjustment takes the maximum value of the P0(j,s) of the sub-bands being used to transmit a certain TB.

It should be understood that the sequence of steps 420 and 430 could be interchangeable. However step 440 comes after 430, as the adjacent sub-band measured power of step 430 is needed as input to step 440. Thus steps 420 and 440 could be combined, provided that step 430 has been carried out before.

At step 5) (450) UE 110 may transmit the signal (for example, PUSCH or PUCCH) on the available n–m sub-bands with the TX power of P0(j,s) plus the one or more offsets determined in step 4 (440).

The network may configure via RRC signaling the level of power offset of step 4 that the UE 110 is adding to the P0(j,s) (410). The amount of power adjustment may be also specific to the type of transmission (for example, PUSCH or PUCCH)), or the type of grant that a UE has. For instance, the adjustment may be specific to traffic having a certain QoS. Alternatively, the boost may be specific to configured grants, or specific to scheduled grants.

According to an example embodiment, the received own signal may have a low dynamic range in case of strong interference on an adjacent sub-band, and the receiver may have sampled the entirety of available sub-bands. The increasing of the own signal's power therefore will help the demodulation and decoding robustness.

The example embodiments may include limitations. For example, while the transmitter may see an interference level in an adjacent sub-band, in general the transmitter may not know what the strength of the interference for the receiver is. The example embodiments do not include specific methods to identify the interference source and/or estimate the level at the receiver. Thus, the example embodiments may alleviate an interference problem in all situations but may boost the power in vain in some cases.

FIG. 5 illustrates an example table 500 for RRC configured offset values.

As shown in FIG. 5, a sub-band index 510 (index 1 to 4) may be referenced against different cases 520 (cases 1 to 4). Additionally, an RRC configured offset 530, per interference level I_1 or I_2 may be considered for each of the sub-band index 510. An example implementation may include a variant based on (different) sub-band transmission limitations assumptions.

According to an example embodiment, assumption 1 may include that the transmissions will happen in contiguous sub-bands. In other words, the transmitter will not transmit on sub-band 1+3 while having interference on sub-bands 2+4. With assumption 1, the system may define a sub-band offset as a function of a single adjacent sub-band interference (per TB and per beam). Table 500 illustrates an example where offsets 530 (0, O1, O2, O3, O4) are defined for two interference levels I_1 and I_2, for two different TB sizes (TB1 and TB2), where the second TB size (TB2) spans two sub-bands.

FIG. 6 illustrates another example table 600 for RRC configured offset values.

As shown in FIG. 6, when the beam dependence (beam index 610) is introduced one may extend the table (of table 500, FIG. 5). In this instance, additional sub-band indexes (5 to 8) may be determined based on the different beam indexes 610 (1 and 2). Additional offsets (RRC configured offset, per interference level, O5 to O8) may be introduced.

According to further example embodiments, other options such as defining a set of offsets for one beam index and adjusting those offsets by another offset based on the beam index, may be used.

For NR-U, example embodiments may implemented by modifying the procedural text in section 38.213 3GPP specifications as follows, where square brackets followed by an asterisk [ ]* indicate the added or modified sections.

a parameter composed of the sum of a component $P_{O\_NOMINAL\_PUSCH,f,c}(j)$ and a component $P_{O\_UE\_PUSCH,f,c}(j)$ [and a component $P_{O\_UE\_SB\_OFFSET,f,c}(s,j)$]* where j∈{0, 1, . . . , J–1} and s=1 . . . n, n being the number of sub-bands.

According to example embodiments:

$$P_{O\_PUSCH,f,c}(s,j) = P_{O\_NOMINAL\_PUSCH,f,c}(j) + P_{O\_UE\_PUSCH,f,c}(j) + P_{O\_UE\_SB\_OFFSET,f,c}(s,j).$$

In 38.213 section 7.1.1 the text could be modified as follows, where brackets followed by an asterisk [ ]* indicate the added or modified sections.

If a UE 110 is not provided with higher layer parameter p0-pusch-alpha-setconfig, j=0, $P_{O\_UE\_PUSCH,f,c}(0)=0$, [and $P_{O\_UE\_PUSCH\_SB-OFFSET,f,c}(0)=0$]*, and $P_{O\_NOMINAL\_PUSCH,f,c}(0)=P_{O\_PRE}+\Delta_{PREAMBLE\_Msg3}$, where the parameter preambleReceivedTargetPower [11, TS 38.321] (for $P_{O\_PRE}$) and msg3-DeltaPreamble (for $\Delta_{PREAMBLE\_Msg}3$) are provided by higher layers for carrier f of serving cell c.

For j∈{2, . . . , J–1}=$S_j$, a $P_{O\_NOMINAL\_PUSCH,f,c}(j)$ value, applicable for all j∈$S_j$, is provided by higher layer parameter p0-nominal-pusch-withgrant for each carrier f of serving cell c and a set of $P_{O\_UE\_PUSCH,f,c}(j)$ values are provided by a set of higher layer parameters p0-pusch-alpha-set in p0-push-alpha-setconfig and a respective set of indexes provided by higher layer parameter p0alphasetindex for UL BWP b of carrier f of serving cell c, and

[a set of $P_{O\_UE\_PUSCH\_SB\_OFFSET,f,c}(s,j)$ values may be provided by a set of higher layer parameters p0-pusch-sub-bandOffsetSet in p0-push-sub-bandOffset-setconfig and a respective set of indexes provided by higher layer parameter p0alphasetindex for UL BWP b of carrier f of serving cell c. If the sub-band adjacent to the not-used sub-band carries a TB spanning two sub-bands, the value dual-TB-sub-Band-Offset-level is applied, and otherwise single-TB-sub-Band-Offset-level is applied.]*

FIG. 7 illustrates an example enhanced PUSCH-Power-Control section 700 including a specialized information element.

The example embodiments may enhance the PUSCH-PowerControl in 38.331 with the element indicated by square brackets followed by an asterisk (for example, [j*). The asterisked section identifies the IE which may be required to be modified/created by way of example, actual required syntax may differ, and may incorporate similar principles as described herein.

As shown in FIG. 7, added section 710 states: p0-sub-bandOffset SEQUENCE (SIZE (1 . . . maxNrofP0-sub-bandOffsets)) OF P0-PUSCH-sub-bandOffset OPTIONAL, —Need M, As shown in FIG. 7, added section 720 states: P0-PUSCH-sub-bandOffset::=SEQUENCE {
 adjacent-sub-band-interference-level value_i_dBm,
 single-TB-sub-bandOffset-level value_O1_dB
 dual-TB-sub-bandOffset-level value_O2_dB.

FIG. 8 illustrates an example table 800 for RRC configured offset values. The notation i in table 800 indicates an interfering sub-band.

FIG. 8 illustrates a variant example embodiment that allows different offset definitions. The examples provide a versatile embodiment in which a table is defined with sub-band interference scenarios, and in which the UE 110 performs lookup accordingly. These example embodiments allow a system to define separate power offsets for every sub-band (for example, O1 to O19), for example case 1 described with respect to table 800.

If assumption 1 does not hold, example embodiments may also define the power offset depending on whether the transmission is surrounded by interfering sub-bands or not, as in cases 7 and 6 in table 800. For example, O13 illustrates an instance in case 7 in which the sub-band used for LBT is surrounded by interfering sub-bands.

As a further variant, example embodiments may calculate the power offset based on sum or weighted sum of adjacent sub-band interferences. For instance, in case 7 of table 800 the offset O13 may depend on the sum of interferences of sub-bands 2 and 3. Or for case 5, the offset O9 may depend on the weighted sum of sub-bands 2, 3, and 4.

FIG. 9 illustrates an example table 900 for offset to a sub-band.

As shown in FIG. 9, table 900 includes a sub-band index 510, a sub-band offset [dB] 910, and sub-band interference power 920.

Example embodiments may implement scaling to avoid exceeding a maximal transmit power. The UE's 110 power headroom P_HR (930) is defined in 38.213 section 7.7 and may be paraphrased as:

$P\_HR = PCmax - P\_PUSCH$

In instances in which example embodiments apply an offset to a particular sub-band, the system may be configured (for example, instructed) to not exceed the power headroom. This may be implemented with a scaling factor h (940). The scaling factor can be for instance formulated as h=P_HR/sum(sub-band offsets), for sum(sub-band offsets) >P_HR. h=1, otherwise.

According to example embodiments, there may be one TB per sub-band 950 and one TB per sub-bands 2+3.

The procedural text for 38.213 may be enhanced based on the example embodiments as follows: [The $P_{O\_UE\_PUSCH\_SB\_OFFSET,f,c}(j,s)$ offsets will be scaled to not exceed the available power headroom which is defined in section 7.7.]*

FIG. 10 shows a flow diagram 1000 representing UE 110 operation according to an example embodiment.

At block 1010, UE 110 may receive RRC: configure power adjustment from gNB 170.

At block 1020, UE 110 may determine at least one transmission power target level, P0(j,s). In this instance j is a beam index, and s is a sub-band index.

UE 110 may perform LBT and measure interference (block 1030). In contrast with prior LBT that only checks whether the energy of a band exceeds a certain threshold, here, the enhanced LBT of the example embodiments is further required to measure that energy level, or measure whether it exceeds additional thresholds that will be later relating to the required robustness in adjacent bands. The thresholds may be part of the configuration provided in block 1010. In some embodiments where beams are used the transmitter will use an offset for the transmit power in the transmit beam based on the interference power in adjacent sub-bands in beams not corresponding to the transmit beam. In those embodiments the LBT would need to be enhanced to also measure the energy in the beams different from the intended transmit beams.

UE 110 may determine power adjustment for transmission as outcome of LBT and measured interference (step 4, block 1040). Computing one or more offsets to each P0(j,s) for the n−m sub-bands that the UE 110 is allowed to use for transmission based on at least one of: the value of m of prohibited sub-bands; the location of m sub-bands with respect to the n−m sub-bands that the UE 110 can use for transmission; the interference power observed on one or more of the m sub-bands that the UE 110 cannot use for transmission; and the amount of sub-bands used by a transport block (TB) transmitted.

The amount of power adjustment may be specific to the type of uplink channel carrying at least one message, in other words, the type of transmission (for example, PUSCH or PUCCH)). The amount of power adjustment may be specific to the type of grant that a UE 110 has (for example, the type of uplink grant assigning the intended transmission). The amount of power adjustment may also be specific to whether the transmission is happening within a COT obtained by the transmitted, or within a COT obtained by another network node. In other words, the amount of power adjustment may depend on whether the transmission is happening in MCOT obtained by the transmitter, or shared MCOT.

This sub process (block 1040) may be referred to as "computing offset". To keep things flexible, in an example embodiment the "computing" may essentially consist of a table-lookup in the UE 110, where the table is configured by gNB 170 via RRC signaling. An initial set of adjustments provided to the UE 110 by RRC can be computed by the network based, for example, on the dynamic range that the node's receiver's digital to analog converter (DAC) is supporting.

UE 110, at 1050, may transmit message on LBT allowed bands (sub-bands). UE 110 may transmit the signal (for example, PUSCH or PUCCH) on the available n−m sub-bands with the TX power of P0(j,s) plus the one or more offsets determined in step 4.

Without in any way limiting the scope, interpretation, or application of the claims appearing below, a technical effect of one or more of the example embodiments disclosed herein is that the received own signal may have a low dynamic range in case of strong interference on an adjacent sub-band, and the receiver having sampled the entirety of available sub-bands. The increasing of the own signal's power therefore will help the demodulation and decoding robustness.

An example embodiment may provide a method comprising determining, by a terminal device, at least one transmission power target level for an intended transmission on at least one sub-band; performing a listen before talk procedure and measuring interference; determining at least one power offset for transmission as outcome of the listen before talk procedure and the measured interference; and transmitting at least one message on at least one listen before talk allowed sub-band, using a transmission power determined based at least in part on the at least one transmission power target level for the intended transmission on the at least one sub-band, and the at least one power offset.

In accordance with the example embodiments as described in the paragraphs above, wherein the at least one power offset is at least one of sub-band specific and beam specific.

In accordance with the example embodiments as described in the paragraphs above, wherein determining the at least one transmission power target level for the intended transmission on the at least one sub-band further comprises: determining the at least one transmission power target level P0(j,s) for an intended transmission on n sub-bands, where j is a beam index, and s is a sub-band index.

In accordance with the example embodiments as described in the paragraphs above, wherein performing the listen before talk and measuring the interference further comprises: measuring at least one of an energy level, and whether the energy level in at least one of the at least one sub-band exceeds at least one additional threshold relating to a required robustness.

In accordance with the example embodiments as described in the paragraphs above, determining, based on the listen before talk procedure, that transmission is not allowed on m of intended n sub-bands, where 0<m<n.

In accordance with the example embodiments as described in the paragraphs above, wherein determining power offset for transmission further comprises: computing at least one offset to each P0(j,s) for n−m sub-bands that the terminal device is allowed to use for transmission.

In accordance with the example embodiments as described in the paragraphs above, computing the at least one offset based on at least one of: a number m of sub-bands that the terminal device is not allowed to use for transmission; a location of m sub-bands with respect to the n−m sub-bands that the terminal device is allowed to use for transmission; an interference power observed on one or more of the m sub-bands that the terminal device is not allowed to use for transmission; a number of sub-bands used by a transport block transmitted; a type of uplink channel carrying the at least one message; a type of uplink grant assigning the intended transmission; and whether transmission is happening within a maximum channel occupancy time obtained by the transmitter, or within a shared channel occupancy time.

In accordance with the example embodiments as described in the paragraphs above, wherein computing the at least one offset further comprises: accessing a lookup table in the terminal device, where the lookup table is configured by at least one base station via radio resource control signaling.

In accordance with the example embodiments as described in the paragraphs above, wherein computing the at least one offset further comprises: receiving an initial set of offsets, wherein the initial set of offsets is determined based on a dynamic range that a digital to analog converter of a receiver of the at least one base station supports.

In accordance with the example embodiments as described in the paragraphs above, wherein transmitting the at least one message further comprising: transmitting the at least on message on the available n−m sub-bands with a transmission power of P0(j,s) plus the at least one offset.

In accordance with the example embodiments as described in the paragraphs above, wherein the power offset takes at least one of: a minimum value of a P0(j,s) of at least one sub-band being used to transmit a particular transport block; and a maximum value of the P0(j,s) of the at least one sub-band being used to transmit the particular transport block.

An example embodiment may provide an apparatus, comprising: means for determining at least one transmission power target level for an intended transmission on at least one sub-band; means for performing listen before talk procedure and measuring interference; means for determining at least one power offset for transmission as outcome of the listen before talk procedure and the measured interference; and means for transmitting at least one message on at least one listen before talk allowed sub-band, using a transmission power determined based at least in part on the at least one transmission power target level for the intended transmission on the at least one sub-band, and the at least one power offset.

In accordance with the example embodiments as described in the paragraphs above, wherein the at least one power offset is at least one of sub-band specific and beam specific.

In accordance with the example embodiments as described in the paragraphs above, wherein the means for determining the at least one transmission power target level for the intended transmission on the at least one sub-band further comprises: means for determining the at least one transmission power target level P0(j,s) for an intended transmission on n sub-bands, where j is a beam index, and s is a sub-band index.

In accordance with the example embodiments as described in the paragraphs above, wherein the means for performing the listen before talk and measuring the interference further comprises: means for measuring at least one of an energy level, and whether the energy level in at least one of the at least one sub-band exceeds at least one additional threshold relating to a required robustness.

In accordance with the example embodiments as described in the paragraphs above, means for determining, based on the listen before talk procedure, that transmission is not allowed on m of intended n sub-bands, where 0<m<n.

In accordance with the example embodiments as described in the paragraphs above, the means for determining the at least one power offset for transmission further comprises: means for computing at least one offset to each P0(j,s) for n−m sub-bands that the terminal device is allowed to use for transmission.

In accordance with the example embodiments as described in the paragraphs above, wherein the means for computing the at least one offset further comprises: means for accessing a lookup table in the terminal device, where the lookup table is configured by at least one base station via radio resource control signaling.

In accordance with the example embodiments as described in the paragraphs above, wherein the means for computing the at least one offset further comprises: means for receiving an initial set of offsets, wherein the initial set of offsets is determined based on a dynamic range that a digital to analog converter of a receiver of the at least one base station supports.

An example embodiment may be provided in an apparatus comprising at least one processor; and at least one non-transitory memory including computer program code, the at least one memory and the computer program code may be configured to, with the at least one processor, cause the apparatus to: determine at least one transmission power target level for an intended transmission on at least one sub-band; perform a listen before talk procedure and measuring interference; determine at least one power offset for transmission as outcome of the listen before talk procedure and the measured interference; and transmit at least one message on at least one listen before talk allowed sub-band, using a transmission power determined based at least in part on the at least one transmission power target level for the intended transmission on the at least one sub-band, and the at least one power offset.

In accordance with the example embodiments as described in the paragraphs above, wherein the at least one power offset is at least one of sub-band specific and beam specific.

In accordance with the example embodiments as described in the paragraphs above, wherein, when determining the at least one transmission power target level for the intended transmission on the at least one sub-band, the at least one processor is further to: determine the at least one transmission power target level P0(j,s) for an intended transmission on n sub-bands, where j is a beam index, and s is a sub-band index.

In accordance with the example embodiments as described in the paragraphs above, wherein, when performing the listen before talk and measuring the interference, the at least one processor is further to: measure at least one of an energy level, and whether the energy level in at least one of the at least one sub-band exceeds at least one additional threshold relating to a required robustness.

In accordance with the example embodiments as described in the paragraphs above, determine, based on the listen before talk procedure, that transmission is not allowed on m of intended n sub-bands, where 0<m<n.

In accordance with the example embodiments as described in the paragraphs above, compute at least one offset to each P0(j,s) for n−m sub-bands that the terminal device is allowed to use for transmission.

In accordance with the example embodiments as described in the paragraphs above, compute the at least one offset based on at least one of: a number m of sub-bands that the terminal device is not allowed to use for transmission; a location of m sub-bands with respect to the n−m sub-bands that the terminal device is allowed to use for transmission; an interference power observed on one or more of the m sub-bands that the terminal device is not allowed to use for transmission; a number of sub-bands used by a transport block transmitted; a type of uplink channel carrying the at least one message; a type of uplink grant assigning the intended transmission; and whether transmission is happening within a maximum channel occupancy time obtained by the transmitter, or within a shared channel occupancy time.

In accordance with the example embodiments as described in the paragraphs above, access a lookup table in the terminal device, where the lookup table is configured by at least one base station via radio resource control signaling.

In accordance with the example embodiments as described in the paragraphs above, receive an initial set of offsets, wherein the initial set of offsets is determined based on a dynamic range that a digital to analog converter of a receiver of the at least one base station supports.

In accordance with the example embodiments as described in the paragraphs above, transmit the at least on message on the available n−m sub-bands with a transmission power of P0(j,s) plus the at least one offset.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments, these descriptions should not be viewed in a limiting sense. Rather, there are several variations and modifications which may be made without departing from the scope of the present invention.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications which may be made without departing from the scope of the present invention as defined in the appended claims.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of example and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method, comprising:
    determining, with a terminal device, at least one transmission power target level for an intended transmission on at least one sub-band, wherein the at least one transmission power target level is sub-band specific and beam specific;
    performing a listen before talk procedure and measuring interference;
    determining at least one power offset, wherein the at least one power offset is configured for transmission based, at least partially, on the listen before talk procedure and the measured interference; and
    transmitting at least one message on at least one listen before talk allowed sub-band, using a transmission power determined based at least in part on both:
        the at least one transmission power target level for the intended transmission on the at least one sub-band, and
        the at least one power offset.

2. The method according to claim 1, wherein the at least one power offset is at least one of sub-band specific or beam specific.

3. The method according to claim 1, wherein performing the listen before talk procedure and measuring the interference further comprises:
    measuring at least one energy level in at least one of the at least one sub-band, and
    determining whether the energy level in the at least one of the at least one sub-band exceeds at least one additional threshold relating to a required robustness.

4. The method according to claim 1, wherein determining the at least one transmission power target level for the intended transmission on the at least one sub-band that is sub-band specific and beam specific further comprises:
    determining the at least one transmission power target level $P0(j,s)$ for the intended transmission on n sub-bands, where j is a beam index, and s is a sub-band index.

5. The method according to claim 4, further comprising:
    determining, based on the listen before talk procedure, that the intended transmission is not allowed on m of intended n sub-bands, where $0<m<n$.

6. The method according to claim 5, wherein determining the at least one power offset further comprises:
    computing at least one offset to ach for respective ones of the at least one transmission power target level $P0(j,s)$ for n-m sub-bands that the terminal device is allowed to use for the intended transmission.

7. The method according to claim 6, further comprising:
    computing the at least one offset based on at least one of:
        the number m of sub-bands that the terminal device is not allowed to use for the intended transmission;
        a location of the m sub-bands with respect to the n-m sub-bands that the terminal device is allowed to use for the intended transmission;
        an interference power observed on one or more of the m sub-bands that the terminal device is not allowed to use for the intended transmission;
        a number of sub-bands used for transmitting of a transport block;
        a type of uplink channel carrying the at least one message;
        a type of uplink grant assigning the intended transmission; or
        whether the transmission is happening within a maximum channel occupancy time obtained with a transmitter, or within a shared channel occupancy time.

8. The method according to claim 6, wherein transmitting the at least one message further comprising:
    transmitting the at least one message on the n-m sub-bands that the terminal device is allowed to use for the intended transmission with the transmission power, where a respective transmission power for the n-m sub-bands is $P0(j,s)$ plus the at least one offset.

9. An apparatus, comprising:
    at least one processor; and
    at least one non-transitory memory storing computer program code configured to, with the at least one processor, cause the apparatus at least to:
        determine, with a terminal device, at least one transmission power target level for an intended transmission on at least one sub-band, wherein the at least one transmission power target level is sub-band specific and beam specific;
        perform a listen before talk procedure and measure interference;
        determine at least one power offset, wherein the at least one power offset is configured for transmission based, at least partially, on the listen before talk procedure and the measured interference; and
        transmit at least one message on at least one listen before talk allowed sub-band, using a transmission power determined based at least in part on both:
            the at least one transmission power target level for the intended transmission on the at least one sub-band, and
            the at least one power offset.

10. The apparatus of claim 9, wherein the at least one power offset is at least one of sub-band specific or beam specific.

11. The apparatus according to claim 9, wherein causing the apparatus at least to perform the listen before talk procedure and measure the interference further comprises the at least one memory storing the computer program code is configured to, with the at least one processor, cause the apparatus to:
measure at least one energy level in at least one of the at least one sub-band, and
determine whether the energy level in the at least one of the at least one sub-band exceeds at least one additional threshold relating to a required robustness.

12. The apparatus according to claim 9, wherein causing the apparatus at least to determine the at least one transmission power target level for the intended transmission on the at least one sub-band that is sub-band specific and beam specific further comprises causing the at least one memory storing the computer program code is configured to, with the at least one processor, cause the apparatus to:
determine the at least one transmission power target level P0(j,s) for the intended transmission on n sub-bands, where j is a beam index, and s is a sub-band index.

13. The apparatus according to claim 9, wherein the at least one memory storing the computer program code is configured to, with the at least one processor, further cause the apparatus at least to:
determine, based on the listen before talk procedure, that the intended transmission is not allowed on m of intended n sub-bands, where 0<m<n.

14. The apparatus according to claim 13, wherein causing the apparatus to at least determine the at least one power offset further comprises the at least one memory storing the computer program code is configured to, with the at least one processor, cause the apparatus to:
compute at least one offset for respective ones of the at least one transmission power target level P0(j,s) for n-m sub-bands that the terminal device is allowed to use for the intended transmission.

15. The apparatus according to claim 14, further comprising the at least one memory storing the computer program code is configured to, with the at least one processor, cause the apparatus to:
compute the at least one offset based on at least one of:
the number m of sub-bands that the terminal device is not allowed to use for the intended transmission;
a location of the m sub-bands with respect to the n-m sub-bands that the terminal device is allowed to use for the intended transmission;
an interference power observed on one or more of the m sub-bands that the terminal device is not allowed to use for the intended transmission;
a number of sub-bands used for transmitting of a transport block;
a type of uplink channel carrying the at least one message;
a type of uplink grant assigning the intended transmission; or
whether the transmission is happening within a maximum channel occupancy time obtained with a transmitter, or within a shared channel occupancy time.

16. The apparatus according to claim 14, wherein causing the apparatus at least to transmit the at least one message further comprises the at least one memory storing the computer program code is configured to, with the at least one processor, cause the apparatus to:
transmit the at least on message on the n-m sub-bands that the terminal device is allowed to use for the intended transmission with the transmission power, where a respective transmission power for the n-m sub-bands is P0(j,s) plus the at least one offset.

17. The apparatus according to claim 9, wherein causing the apparatus at least to compute the at least one power offset further comprises the at least one memory storing the computer program code is configured to, with the at least one processor, cause the apparatus to:
access a lookup table in the terminal device, where the lookup table is configured via at least one base station via radio resource control signaling.

18. The apparatus according to claim 17, wherein causing the apparatus at least to compute the at least one power offset further comprises the at least one memory storing the computer program code is configured to, with the at least one processor, cause the apparatus to:
receive an initial set of offsets, wherein the initial set of offsets is reflective of a dynamic range that a digital to analog converter of a receiver of the at least one base station supports.

19. The apparatus according to claim 9, wherein the at least one power offset takes at least one of:
a minimum value of the transmission power target level of the at least one sub-band being used to transmit a particular transport block; or
a maximum value of the transmission power target level of the at least one sub-band being used to transmit the particular transport block.

20. A non-transitory program storage device readable via a machine, tangibly embodying a program of instructions executable via the machine for performing operations, the operations comprising:
determining at least one transmission power target level for an intended transmission on at least one sub-band, wherein the at least one transmission power target level is sub-band specific and beam specific;
performing a listen before talk procedure and measuring interference;
determining at least one power offset, wherein the at least one power offset is configured for transmission based, at least partially, on the listen before talk procedure and the measured interference; and
transmitting at least one message on at least one listen before talk allowed sub-band, using a transmission power determined based at least in part on both:
the at least one transmission power target level for the intended transmission on the at least one sub-band, and
the at least one power offset.

* * * * *